Sept. 21, 1926.
V. H. HARBERT
1,600,819
RETAINING VALVE ANCHOR
Filed Sept. 16, 1925
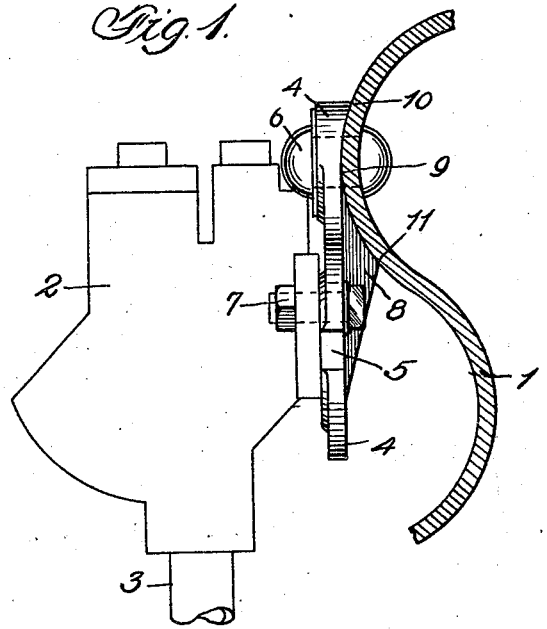
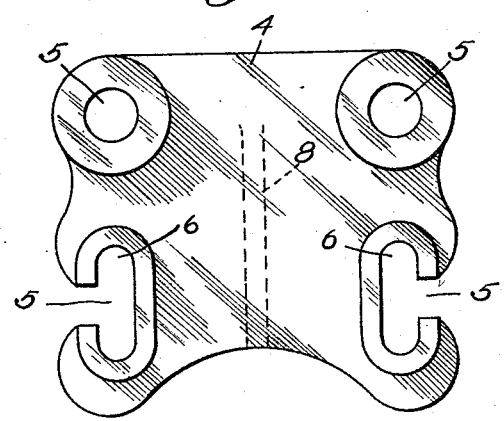
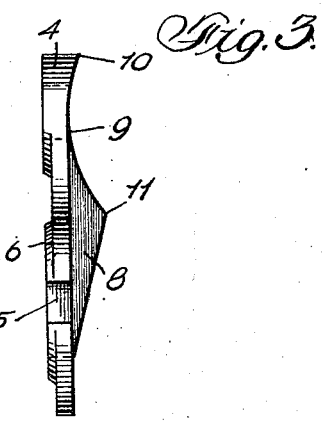
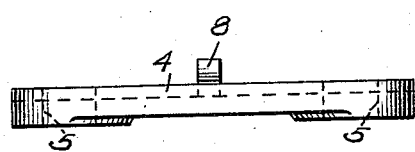

Patented Sept. 21, 1926.

1,600,819

UNITED STATES PATENT OFFICE.

VICTOR H. HARBERT, OF SPRINGFIELD, ILLINOIS.

RETAINING-VALVE ANCHOR.

Application filed September 16, 1925. Serial No. 56,713.

Retaining valves are applied to cars to make movement of train safe, and to conserve the supply of air, and this valve, when set and in good working order, does not allow all of the air to escape from the brake cylinders, but retains a certain amount of pressure therein sufficient to hold the brakes in a set position, while the air is being replenished in the train line. When the air pressure in the line is increased or replenished, if the retaining valve is in an inoperative condition, the triple valve will automatically assume a released position allowing all of the air to escape from the brake cylinder, releasing the brakes, and allowing the train to gain momentum, and run out of control. It is, therefore, of the utmost importance that the retaining valve be in good working order at all times.

Retaining valves have in the past been secured to cars by lag screws and by bolts, the retaining valve being located on the outside at the end of the car and near the top of the car. When bolts are used, and this has been the most universal way of securing valves to the car, the bolts extend from the inside of the car, the nuts on the end of the bolt being on the outside of the car. This type of fastening has been found objectionable from many standpoints, in that the lag screws and bolts work loose to such an extent that the service movements of a car tend to give a sidewise movement to the retaining valve, which, with the pipe leading from the air brake system of the car, moves somewhat after the fashion of a pendulum. Such condition is prohibited by the United States safety appliance laws, inasmuch as it reduces the efficiency of the brake system, besides endangering the lives of trainmen. Another objection is that in case of bolts, the heads of which are on the inside of the car; if these bolts become loose during transit, the only way to get at the bolt is to unload the car, which can only be done at great expense, and sacrifices the safety of the goods removed from the car, and increases the liability of the railroad for damage and stolen goods.

The object of my present invention is to provide an anchor for a retaining valve, especially adapted for attachment to the corrugated steel ends now so generally used on freight cars, the anchor being so designed for snug application to one of the corrugations of the steel end of a car so that the retaining valve pipe will not stick out too far from the end of the car.

Another object of my invention is to provide a retaining valve anchor for application to a corrugated end of a car so designed as to have a maximum bearing on one of the corrugations of the car end.

In the drawings:

Figure 1 is a large sectional fragmentary portion of a corrugated steel end of a car, with my improved anchor attached thereto, and with a retaining valve attached to the anchor.

Figure 2 is a front elevation of a retaining valve bracket, embodying my invention.

Figure 3 is an end elevation of Figure 2.

Figure 4 is a top plan view of Figure 2.

The reference numeral (1) designates a fragmentary portion of a corrugated steel end of a car, the retaining valve being designated by the reference numeral (2) to which the air pipe (3) is conneceted, said air pipe being connected up with the air brake system of the car.

My improved retaining valve bracket comprises a base (4) having suitable bolt or rivet openings (5) at the upper corners through which the rivets (6) are adapted to pass whereby the anchor is firmly and rigidly secured to the end of the car. This base (4) is also provided with slots (5) in its side edges, connected with elongated slots (6) vertically disposed whereby the bolts (7) may be passed through the slots (6) to secure the retaining valve (2) to the anchor. In the first application of the valve to the anchor, the bolts (7) will be placed at the upper ends of the elongated slots (6), so that in the event of the shortening of the air pipe (3), for any reason, such for instance as rethreading the upper end of the pipe (3) in case of breakage at the connection with the retaining valve, the bolts may be adjusted to lowered positions in the slots (6) as will be readily understood by those skilled in the art.

I provide the base plate (4) with a rearwardly extending strengthening rib or flange (8). There may be as many of these flanges as may be desired or required by the railroads, and these flanges terminate at their upper ends in concave seat (9) adapted to receive the upper portion of one of the corrugations of the steel end (1). It will be noted in Figure 1 that the upper end of the concave seat (9) extends inwardly as at

(10) on the corrugation to which it is secured so that the concaved seat (9) substantially hugs the apex portion of the corrugation to which the anchor is secured, thereby assisting very materially in intimately connecting the anchor with the corrugation with a maximum of bearing contact or surface between the corrugation and the anchor. This extended seat contact and overlapping of the corrugation by the anchor also reduces to a minimum the liability of the rivets (6) being sheared.

It will also be noted that the concave seat (10) extends to the point (11) of the corrugation thereby still further increasing the bearing contact between the anchor and the corrugation.

While I have shown in my drawings for the purpose of illustrating the invention a sinuous corrugation in an end sheet, it, of course, will be understood that my invention provides for a seat on the rear face of a retaining valve anchor adapted to receive other types of corrugations and pressed out beams which are commonly used on steel end sheets of railroad cars.

It is obvious that changes may be made in my improved anchor, within the spirit of my invention and without departing from the scope of the appended claims.

What I claim is:

1. The combination with the corrugated end of a car, of a retaining valve anchor having a concave seat adapted to receive a portion of one of the corrugations of said car end.

2. A retaining valve anchor comprising a base having suitable bolt openings to receive bolts whereby a retaining valve may be secured to said base, and rivet openings whereby the base may be secured to a car, and a concave seat on the rear face of the anchor.

3. A retaining valve anchor comprising a base adapted to support a retaining valve on a car, and a concave seat on the rear face of said base.

4. A retaining valve anchor comprising a base, a rib on the rear face of said base terminating at its upper end portion in a concave seat.

5. A retaining valve anchor comprising a base adapted to support a retaining valve on a car and having a seat on and projecting rearwardly from its rear face.

In testimony whereof I affix my signature.

VICTOR H. HARBERT.